United States Patent [19]
Bennett

[11] Patent Number: 5,143,051
[45] Date of Patent: Sep. 1, 1992

[54] PASSIVE SOLAR HEATING APPARATUS

[76] Inventor: Mark D. Bennett, 103 Macoupin Rd., Benld, Ill. 62009

[21] Appl. No.: 808,231

[22] Filed: Dec. 16, 1991

[51] Int. Cl.[5] .............................. F24J 2/42
[52] U.S. Cl. ........................ 126/415; 126/440
[58] Field of Search .......................... 126/415, 440

[56] References Cited
U.S. PATENT DOCUMENTS

| 4,188,941 | 2/1980 | Hopkins | 126/440 |
| 4,459,970 | 7/1984 | Clee | 126/415 |

*Primary Examiner*—Carroll B. Dority
*Attorney, Agent, or Firm*—Leon Gilden

[57] ABSTRACT

An apparatus for heating of a body of water is floatingly received within the body of water. The collector includes a housing formed with an interior cavity containing aluminum oxide crystals in communication with collector tubes extending orthogonally downwardly relative to the housing also filled with the aluminum oxide crystals. A lens assembly plate is mounted above the cavity, with the lens assembly including a matrix of magnification lens members coextensively directed throughout the plate above the cavity. A modification of the invention includes a water storage tank for the storage and heating of water in association with a heating tank structure.

5 Claims, 4 Drawing Sheets

PASSIVE SOLAR HEATING APPARATUS

BACKGROUND OF THE INVENTION

1. Field of the invention

The field of invention relates to passive solar heating apparatus, and more particularly pertains to a new and improved passive solar heating apparatus wherein the same is arranged to be floatingly received within a body of water for heating the same.

2. Description of the Prior Art

Solar collectors of various types are utilized throughout the prior art for heating of water and the like to minimize dependence and expense of conventional energy sources. Such apparatus is exemplified in U.S. Pat. No. 4,587,952 to Richardson as a passive solar heater and includes a collector pivotally mounted relative to a support stand.

U.S. Pat. No. 4,217,882 to Feldman, Jr. sets forth a further passsive solar heater collector utilizing a through type solar collector in cooperation with a heat pipe energy absorber and insulated storage tank.

Further examples are set forth in the U.S. Pat. Nos. 4,355,629 to Cornell, III and 4,273,100 to Cogliano.

As such, it may be appreciated that there continues to be a need for a new and improved passive solar heating apparatus as set forth by the instant invention which addresses both the problems of ease of use as well as effectiveness in construction setting forth a compact and readily maintained efficient manner of heating water and in this respect, the present invention substantially fulfills this need.

SUMMARY OF THE INVENTION

In view of the foregoing disadvantages inherent in the known types of solar heating apparatus now present in the prior art, the present invention provides a passive solar heating apparatus wherein the same is arranged for floating reception within a body of water for heating the body of water. As such, the general purpose of the present invention, which will be described subsequently in greater detail, is to provide a new and improved passive solar heating apparatus which has all the advantages of the prior art solar heating apparatus and none of the disadvantages.

To attain this, the present invention provides an apparatus for heating of a body of water floatingly received within the body of water. The collector includes a housing formed with an interior cavity containing aluminum oxide crystals in communication with collector tubes extending orthogonally donwardly relative to the housing also filled with the aluminum oxide crystals. A lens assembly plate is mounted above the cavity, with the lens assembly including a matrix of magnification lens members coextensively directed throughout the plate above the cavity. A modification of the invention includes a water storage tank for the storage and heating of water in association with a heating tank structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in anyway.

It is therefore an onject of the present invention to provide a new and improved passive solar heating apparatus which has all the advantages of the prior art solar heating apparatus and none of the disadvantages.

It is another ooject of the present invention to provide a new and improved passive solar heating apparatus which may be easily and efficiently manufactured and marketed.

It is a further object of the present invention to provide a new and improved passive solar heating apparatus which is of a durable and reliable construction.

An even further object of the present invention is to provide a new and improved passive solar heating apparatus which is susceptible of a low cost of manufacture with regard to both materials and labor, and which accordingly is then susceptible of low prices of sale to the consuming public, thereby making such passive solar heating apparatus economically available to the buying public.

Still yet another object of the present invention is to provide a new and improved passive heating apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
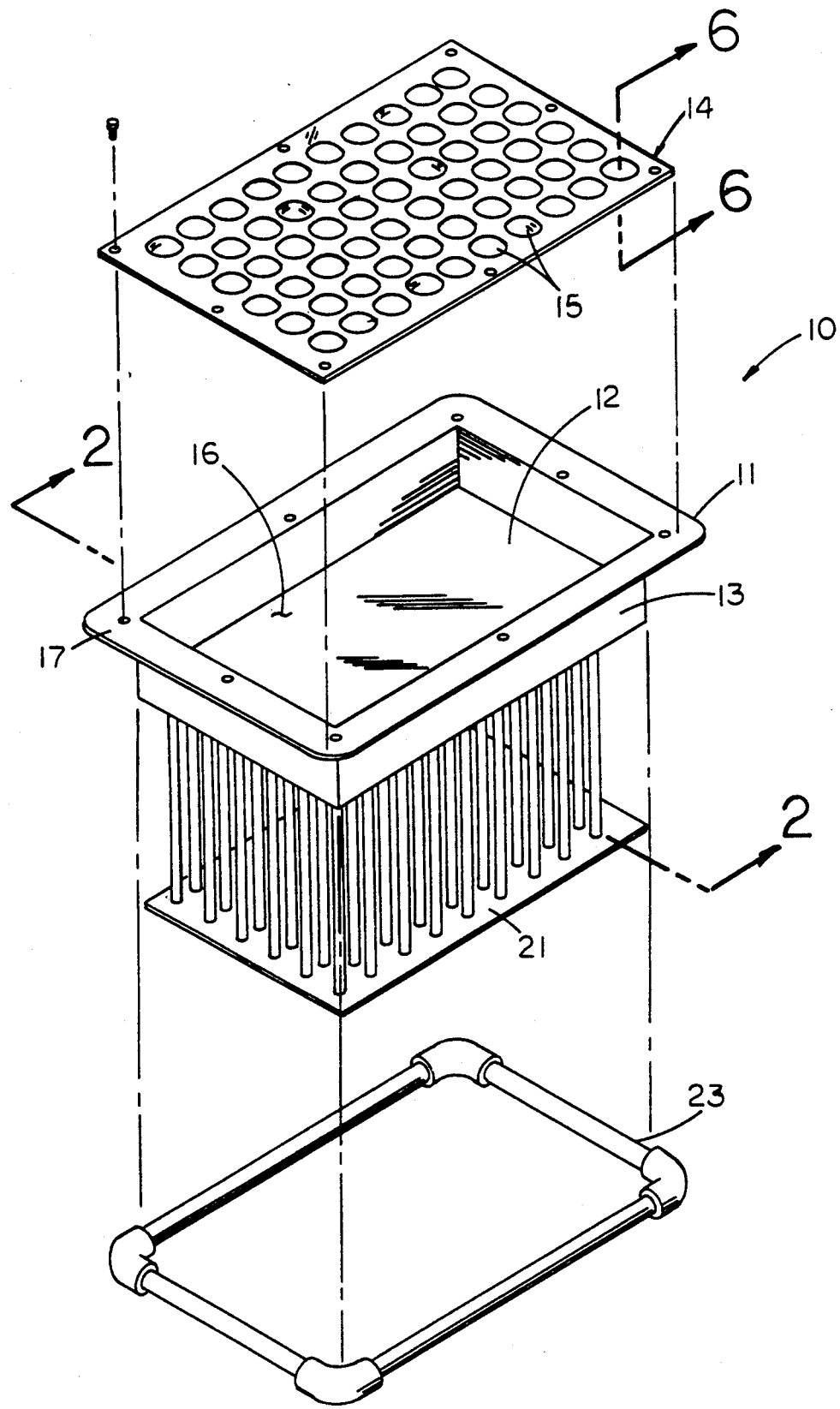
FIG. 1 is an isometric exploded illustration of the collector apparatus of the invention.
Figure 2:
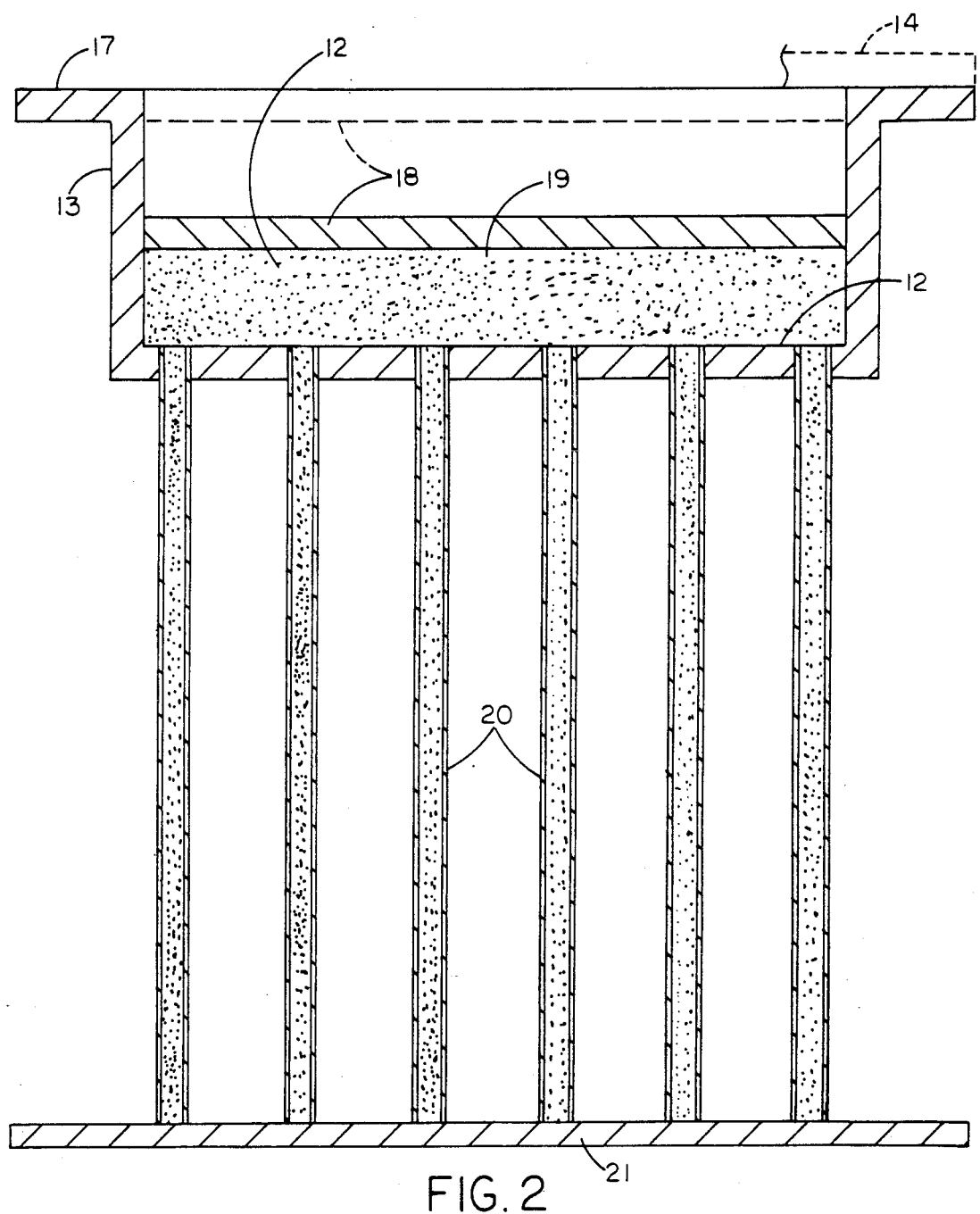
FIG. 2 is an orthographic view, taken along the lines 2—2 of FIG. 1 in the direction indicated by the arrows.

With reference now to the drawings, and in particular to FIGS. 1 to 9 thereof, a new and improved passive solar heating apparatus embodying the principles and concepts of the present invention and generally designated by the reference numeral 10 will be described.

More specifically, the passive solar heating apparatus 10 of the instant invention essentially comprises a solar collector housing 11 formed with a housing floor 12 to include a non-glare, preferably black, coating coextensive with a top surface thereof. Aluminum oxide paint has been found suitable for this purpose. The housing 11 is further a defined by continuous side wall 13 that includes a housing flange abutment 17 orthogonally and projecting exteriorly of the housing integrally mounted to an upper distal end of the side wall. A lens assembly plate 14 is arranged for mounting to the side wall at an upper distal end thereof, wherein the lens assembly plate 14 includes a matrix of magnification lens members 15 coextensive therethrough to enhance magnification of the housing cavity 16. The housing cavity 16 is preferably formed with a quantity of aluminum oxide powder 19 within the housing cavity 16 contained between the housing top panel 18 and the housing floor 12. The aluminum oxide crystals may be arranged in a portion of the cavity or coextensive with the complete volumetric capacity of the cavity 16, such as illustrated in phantom in FIG. 2 Collector tubes 20 are orthogonally and fixedly mounted to a bottom surface of the floor 12 extending downwardly therefrom filled with aluminum oxide powder in communication with the housing cavities 16. A tubular flotation ring 23 is arranged in surrounding relationship relative to the side wall 13 in contiguous communication with a bottom surface of the flange 17 to impart flotation to the organization in use. A stabilizer plate 21 may be optionally mounted to a lower distal end of the collector tubes 20 in an orthogonal relationship to stabilize as well as assist in imparting a transfer to an associated body of water, but as noted, the use of a stabilizer plate 21 is an optional feature of the instant invention.

Figure 3:
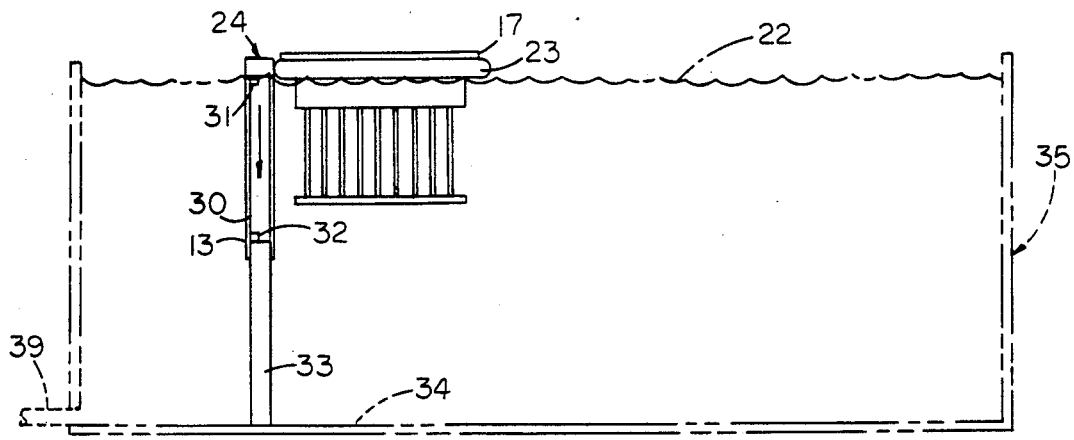
FIG. 3 is an orthographic view of the invention mounted within a body of water utilizing an alarm associated therewith.
Figure 4:
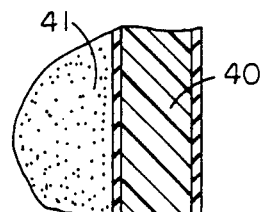
FIG. 4 is an orthographic cross-sectional view of section 4 set forth in FIG. 8.
Figure 5:
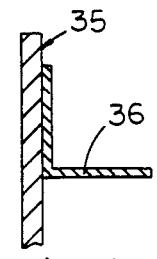
FIG. 5 is an orthographic view, taken along the lines 5—5 of FIG. 8 in the direction indicated by the arrows.
Figure 6:
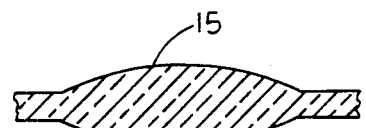
FIG. 6 is a cross-sectional illustration, taken along the lines 6—6 of FIG. 1 in the direction indicated by the arrows.
Figure 7:
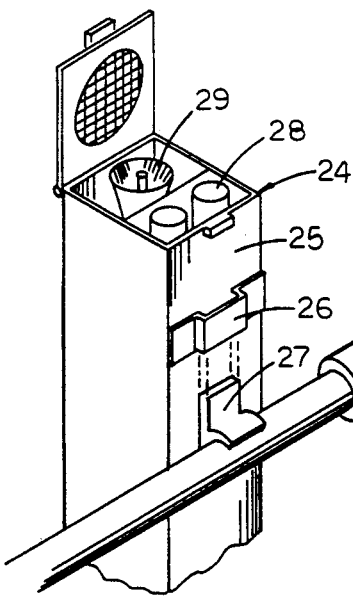
FIG. 7 is an isometric enlarged illustration of an upper portion of the alarm housing utilized by the invention.
Figure 9:
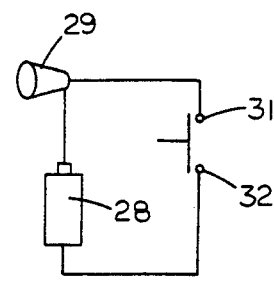
FIG. 9 is a diagrammatic illustration of the alarm circuitry utilized by the invention as set forth in FIG. 3.

Reference to FIG. 3 illustrates a body of water top surface 22 floatingly receiving the collector housing, wherein as illustrated in FIG. 3, an alarm housing 24 is mounted to the flotation ring 23. The alarm housing 24 is formed with an alarm housing side wall 25 that includes a mounting loop 26 receiving a mounting lug 27 that is fixedly secure to the flotation ring 23. The alarm housing 24 includes at least one battery member 28 in cooperation with an alarm speaker 29 to provide for an audio alarm upon reduced levels of water within a container, such as illustrated in FIG. 3. The alarm organization further includes the alarm housing 24 formed with an alarm housing tubular lower body portion 30 slidingly and telescopingly receiving a mounting post 33 that is fixedly and orthogonally mounted to the water container floor 34. The lower tubular body portion 30 includes a first switch contact 31 mounted with an upper distal end of the tubular lower body portion 30 as the first switch contact 31 is horizontally aligned with a bottom surface of the flotation ring 23. A second switch contact 32 mounted to an upper distal end of the mounting post 33 effects closing of the thusly formed switch and sounding of the alarm, in a manner as illustrated in the diagrammatic illustration of FIG. 9.

Figure 8:
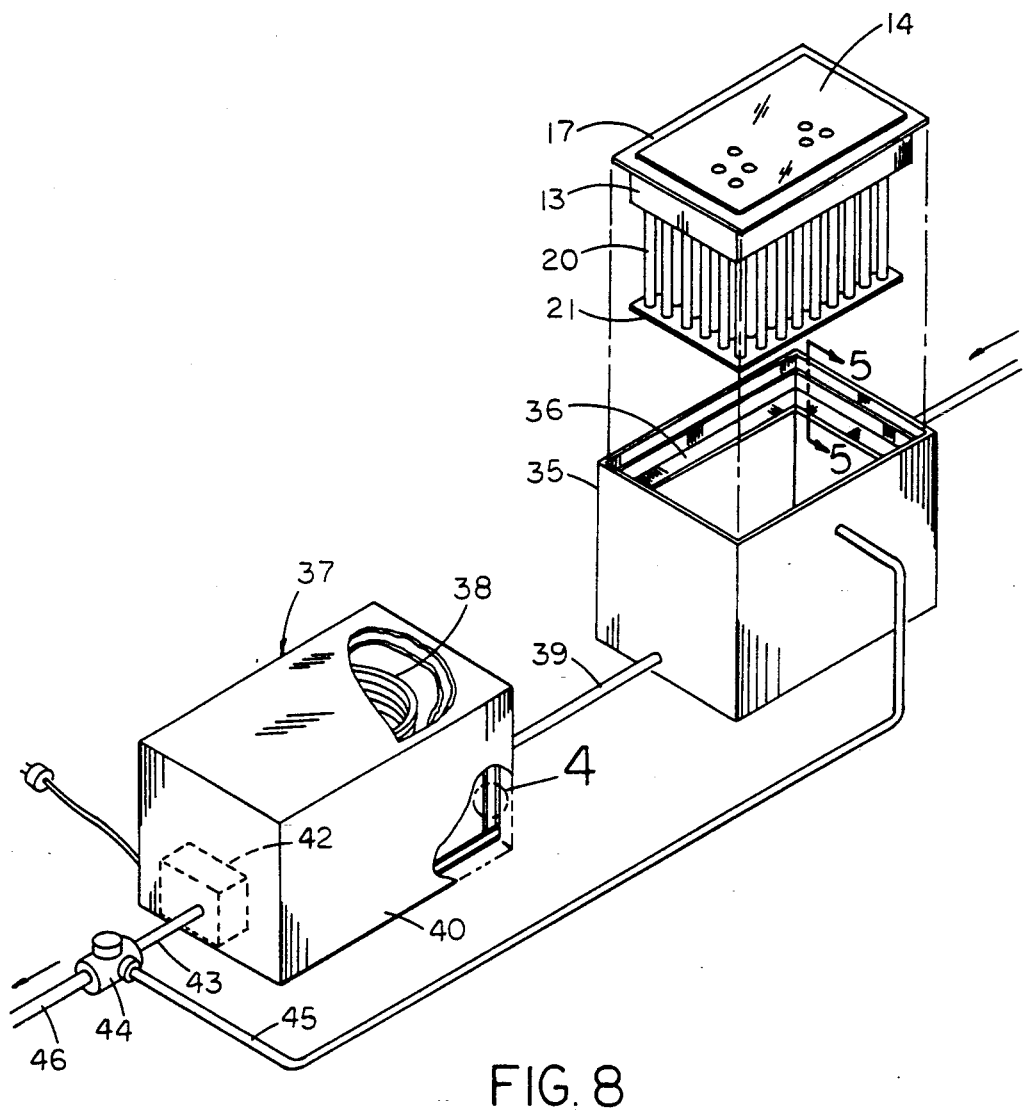
FIG. 8 is an isometric illustration of a water heating apparatus utilized by the invention.

The FIG. 8 illustrates the use of a water heating system for use by the instant invention, wherein a water tank 35 includes a perimeter abutment flange 36 mounted to an interior surface of the tank 35 adjacent its upper distal end to effect positioning and mounting of the flange abutment 17 thereon of the associated collector organization. A water storage tank 37 is provided to include a fluid coil 38 in communication with the water tank 35 by a first conduit 39 receiving water at an elevated temperature through the first conduit 39 into the fluid coil 38. The water storage tank 37 includes an insulated tank wall 40, as well as aluminum oxide crystals and anti-freeze solution in a 90-10 mixture interiorly of the water storage tank 37. A pump 42 is provided within the water storage tank 37 to pump water at temperature through a second conduit 43 continuously. A thermostatically controlled zone valve 44 is provided exteriorly of the water storage tank 37 in communication therewith, and with the pump 42 through a second conduit 43. Water at a properly elevated temperature is directed through zone valve 44 through a fourth conduit 46. Should the zone valve not receive water at a proper and desirable temperature, a third conduit 45 recirculates the water back to the water container tank 35.

It should be further noted that the water container tank 35 may be modified to include the alarm construction of the FIG. 3 in lieu of the abutment flange 36. In this manner, a malfunctioning in the return delivery aspect of the invention may be readily identified.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimentional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A passive solar heating apparatus, comprising,
a solar collector housing, the solar collector housing including a housing floor, and
a continuous housing side wall, and
a housing cavity defined within the housing above the floor within the side wall, and
a magnification lens member mounted coextensively over the cavity to an upper distal end of the side wall, and
a housing flange abutment integrally and orthogonally mounted to an upper distal end of the side wall extending exteriorly of the cavity, with a tubular flotation ring mounted in surrounding relationship relative to the side wall below the flange abutment in contiguous communication therewith, and
the lens assembly plate including a matrix of magnification lens members mounted within the lens assembly plate, and
a matrix of collector tubes integrally and orthogonally mounted to a bottom surface of the housing floor extending downwardly therefrom, the housing cavity and the collector tubes filled with aluminum oxide powder.

2. An apparatus as set forth in claim 1 including a housing top panel mounted above the floor extending coextensively above the cavity and the aluminum oxide powder.

3. An apparatus as set forth in claim 2 including a stabilizer plate integrally and orthogonally mounted to the lower distal ends of the collector tubes.

4. An apparatus as set forth in claim 3 including a water container tank, the water container tank including a mounting post integrally and orthogonally mounted to a water container floor of the water container tank, with the mounting post extending upwardly relative to the water container floor within the water container tank, and second switch mounted to an upper distal end of the mounting post, and as alarm housing mounted to the flotation ring, the alarm housing telescopingly and slidingly receiving the mounting post therewithin, and the alarm housing including a first switch contact mounted within the alarm housing, wherein the first switch contact is horizontally aligned with a bottom surface of the flotation ring, and an audio alarm means mounted within the alarm housing for actuation upon the first switch contacting one another.

5. An apparatus as set forth in claim 4 including a first conduit directed into and in fluid communication with the water container tank, with the first conduit directed into the water container tank adjacent the water container floor, and the first conduit extending from the water container tank into a water storage tank, the water storage tank including a fluid coil in fluid communication with the first conduit windingly mounted within the water storage tank, and the water storage tank including aluminum oxide crystals and anti-freeze mixture contained therewithin in surrounding relationship relative to the fluid coil, and a second conduit extending exteriorly of the water storage tank in fluid communication with the fluid coil, wherein the second conduit extends to a thermostatically controlled zone valve, wherein the zone valve is in fluid communication with a fourth conduit upon water within the second conduit attaining a predetermined temperature, and a third conduit in fluid communication with the zone valve directed from the zone valve to the water container within the second conduit below the predetermined temperature.

* * * * *